(12) United States Patent
Botzet

(10) Patent No.: US 6,216,826 B1
(45) Date of Patent: Apr. 17, 2001

(54) BANK HOIST BRAKING APPARATUS

(76) Inventor: Michael John Botzet, 501 W. Juniper, P.O. Box 446, Frazee, MN (US) 56544

( * ) Notice: Subject to any disclaimer, the term of this patent is extended or adjusted under 35 U.S.C. 154(b) by 0 days.

(21) Appl. No.: 09/234,662

(22) Filed: Jan. 19, 1999

(51) Int. Cl.$^7$ .................................................. B60T 8/72
(52) U.S. Cl. ...................................... 188/181 R; 187/375
(58) Field of Search ............................... 188/181 R, 180, 188/188, 189; 187/350, 351, 373, 375, 287

(56) References Cited

U.S. PATENT DOCUMENTS

| | | | |
|---|---|---|---|
| 1,959,528 | * | 5/1934 | Federici ............................... 187/375 |
| 2,511,697 | * | 6/1950 | Clift ..................................... 187/375 |
| 2,944,635 | * | 7/1960 | Wittkuhns ....................... 188/188 X |
| 4,653,612 | | 3/1987 | Winkler . |
| 4,662,481 | | 5/1987 | Morris et al. . |
| 4,856,623 | | 8/1989 | Romig, Jr. . |
| 5,052,523 | * | 10/1991 | Ericson ............................... 187/350 |
| 5,310,022 | | 5/1994 | Sheridan et al. . |
| 5,492,200 | | 2/1996 | Korhonen . |
| 5,630,483 | | 5/1997 | Karner . |

* cited by examiner

Primary Examiner—Robert J. Oberleitner
Assistant Examiner—Melanie Talavera
(74) Attorney, Agent, or Firm—Curtis V. Harr

(57) ABSTRACT

A braking mechanism for use with a lift is provided that interacts with a fixed cable that runs the length of the path of travel of the lift. The interaction of the cable and braking mechanism transfers the rotational power created by the travel of the braking mechanism over the cable to a centrifugal clutch. When an over speed situation is encountered by the lift, the centrifugal clutch expands and causes the rotational force to be transferred to the cam sprocket which forces an offset portion of the trip lobe upward until it engages and releases a cam lock. This releases the load on the spring which rotates the cable cam which in turn closes the distance between its lower surface and the floor of the cam housing. The result of this is that the fixed cable is pinched between the cable cam and the cam housing which effectively stops the relative motion between the braking mechanism which in turn stops the motion of the lift.

17 Claims, 4 Drawing Sheets

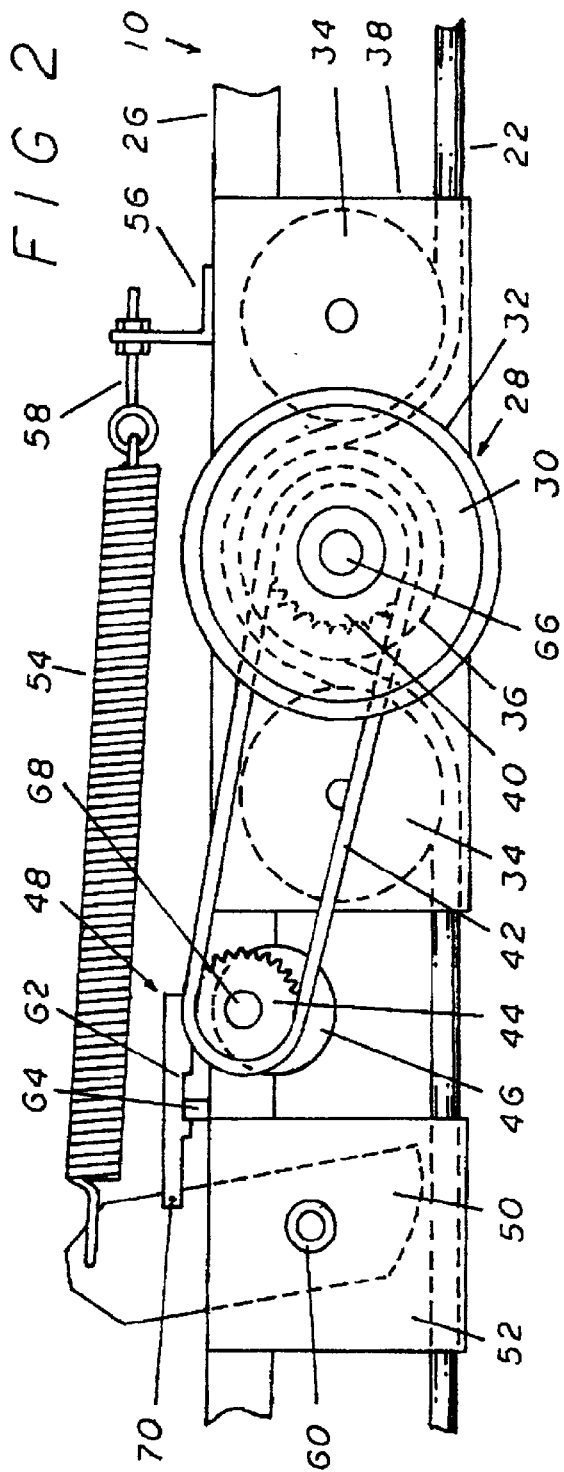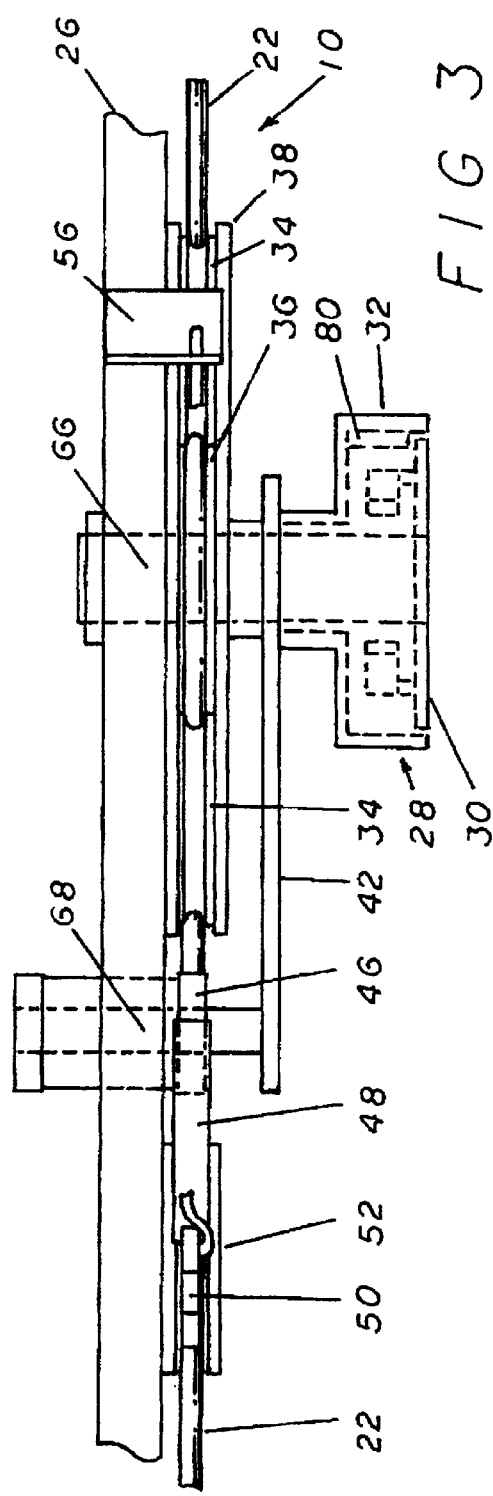

BANK HOIST BRAKING APPARATUS

BACKGROUND OF THE INVENTION

The present invention relates to an improvement in lifts, and more specifically in braking apparatus' used to stop BANK HOISTS and elevators smoothly in over speed situations.

Many home builders and home owners often find it desirable to build on large hills or cliffs overlooking lake fronts or scenic areas. An inherent problem with this type of terrain is that the user of the home often desires to get from the home up on a large hill or cliff, down to the lake or base. This often involves placing several flights of stairs or crossing walkways.

A common solution to this has been the use of BANK HOIST type lifts or baskets which run on a rail system and allow users to get up and down large embankments or cliffs easily and without effort. These lifts can be especially advantageous in transporting materials, as well as elderly and young users of the home, to and from different elevations. Often times these lifts may not be completely vertical as elevators commonly are and will run on a track system using wheels. The lifts are often pulled up and down via a cable system and some sort of pulley which winds or unwinds or turns the cable. It has been found that it is desirable to provide some type of braking system for these lifts that will be activated automatically in an over speed situation, such as when a cable spool or cable breaks. This type of brake would keep the BANK HOIST type lift or carriage from free falling. It has also been found that it would be advantageous to provide a system that would automatically brake or stop the carriage smoothly, with no sudden jerking motion to the occupants, in an over speed situation in either direction.

Finally, a large number of these types of lifts exist and are already installed but use out of date or aging braking apparatus'. It would therefore be advantageous to design a braking apparatus that could be used to retro fit older or existing lifts. This same type of braking system may also be used in other types of lifts and elevators.

SUMMARY OF THE INVENTION

It is the primary objective of the present invention to provide a method of effectively and safely stopping a lift in an over speed situation.

It is an additional objective of the present invention to provide such a method that uses a static cable that runs the length of the path of travel of the hoist which interacts with the braking system located on the bottom of the hoist.

It is a further objective of the present invention to provide such a braking mechanism that will engage without the intervention of the user of the lift.

It is still a further objective of the present invention to provide such a system that employs a speed sensitive clutch mechanism to trigger the brake.

These objectives are accomplished by the use of a braking mechanism that is attached to the bottom side of the frame of a lift. The BANK HOIST type lift is a lifting apparatus that is used to transport people and materials up and down inclines without having to resort to the use of stairs. This braking mechanism interacts with a fixed cable that runs the length of the path of travel of the lift. The interaction of the cable and braking mechanism is accomplished by first running the cable over and under a series of wheels in the wheel housing component of the brake and then through the cable cam housing component of the brake.

One of the wheels in the wheel housing transfers the rotational power created by the travel of the braking mechanism over the cable to a centrifugal clutch which is located on the outer side of the wheel housing. The centrifugal clutch is made up of an inner and outer hub in which only the inner hub rotates during the normal operation of the lift. The outer hub is connected to the drive sprocket which in turn is connected to a drive chain. The drive chain extends forward to a point where it engages an additional sprocket located on an axle which is connected to the hoist frame in the gap between the wheel housing and the cable cam housing. This axle also has an offset cam lobe protrusion that is located between the cam sprocket and the hoist frame and the offset portion of the lobe is oriented in a downward manner during the normal operation of the hoist.

The cable cam, which is the component of the invention which actually performs the braking operation, is located within the cable cam housing which is again attached to the hoist frame. The cable cam is pivotally mounted to the housing towards its lower end and is attached to a high tension spring at its upper end. During normal operation of the hoist, the upper end of the cable cam is forced forward and held in place by the use of the cam lock which extends rearward to end at a point just above the trip lobe located on the cam sprocket axle. The locking of the cable cam in this position loads the high tension spring and rotates the lower end of the cable cam just enough to allow the fixed cable to pass through the cam housing beneath the lower surface of the cable cam.

When an over speed situation is encountered by the lift, the centrifugal clutch located in the inner hub of the clutch assembly expands and catches a protruding tab located on the inner surface of the outer hub. This causes the rotational force of the inner hub to be transferred to the outer hub which rotates the cam sprocket through the drive sprocket and drive chain. The rotation of the cam sprocket forces the offset portion of the trip lobe upward until it engages and releases the cam lock. This releases the load on the spring which rotates the cable cam which in turn closes the distance between its lower surface and the floor of the cam housing. Therefore, the fixed cable is pinched between the cable cam and the cam housing which effectively stops the relative motion between the braking mechanism, which stops the motion of the lift.

For a better understanding of the present invention reference should be made to the drawings and the description in which there are illustrated and described preferred embodiments of the present invention.

DESCRIPTION OF THE DRAWINGS

FIG. 2 is a side elevation view of the present invention showing its method of construction and the manner in which it interacts with the fixed cable of the lift carriage.

FIG. 3 is a top elevation view of the present invention showing its method of construction and the manner in which it interacts with the fixed cable of the lift carriage.

DESCRIPTION OF THE PREFERRED EMBODIMENT

Figure 1:
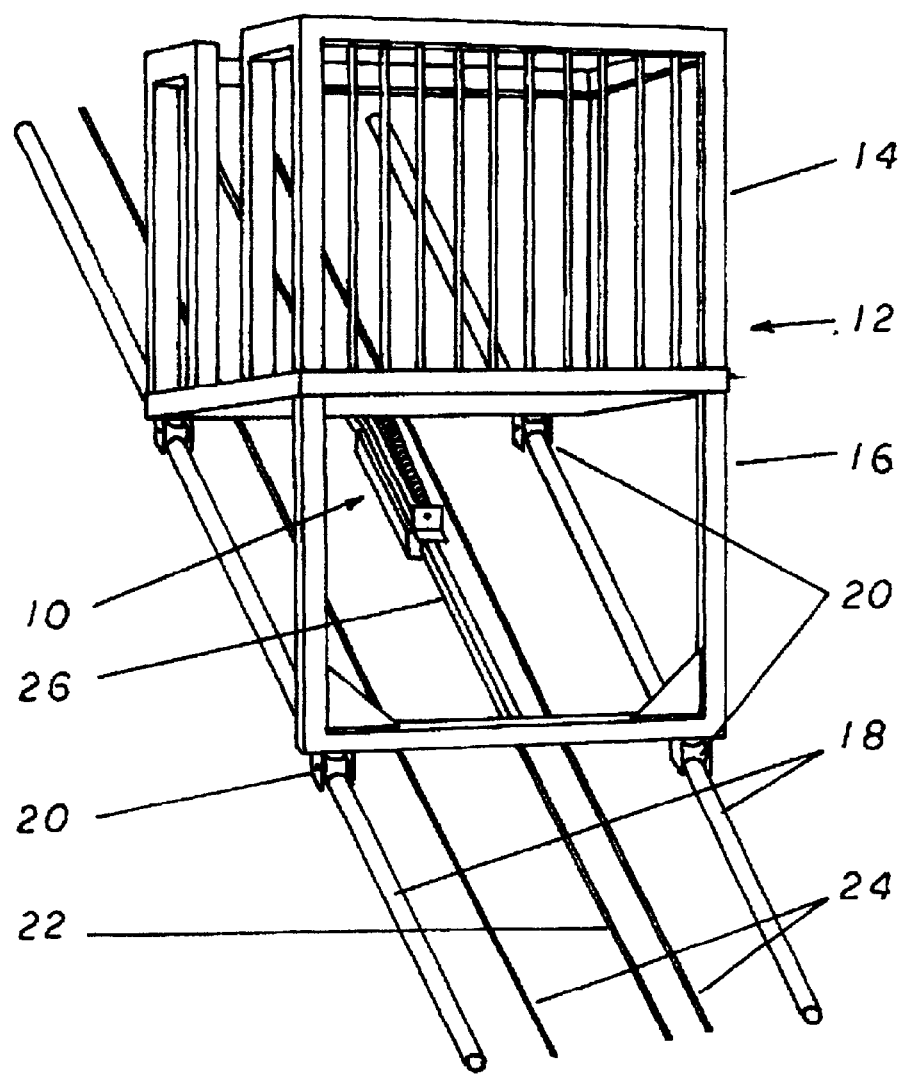
FIG. 1 is a perspective view of a typical lift carriage used in the place of a stairway to transport people and materials up and down an inclined surface that would employ the present invention as a braking system to ensure that the carriage can not freewheel down the incline.

Referring now to the drawings, and more specifically to FIG. 1, the BANK HOIST braking apparatus 10 is a device that is typically used with a lift 12 or other similar apparatuses that are employed to transport people and materials up and down slopes that would otherwise have to be negotiated by a lengthy stairway. The lift 12 itself is typically made up of a hoist frame 16 which supports a hoist carriage 14 and a pair of hoist rails 18 which are permanently fixed to the surface of the slope and provide the lift 12 with a track which it follows in its course up an down the slope.

The hoist frame 16 is formed in a downwardly oriented L-shaped configuration which creates an angle between the forward and rearward edges of the lift frame which corresponds to the predominate angle of the slope over which the lift 12 is to travel. Each corner of the hoist frame 16 is equipped with a downwardly extending rail wheel 20 which have concave rolling surfaces that engage the hoist rails 18. These concave surfaces of the rail wheels 20 fit over and partially around the tubular hoist rails 18 and serve to keep the lift 12 securely in position throughout its travel on the slope. Additionally, the hoist frame 16 also forms a platform onto which the hoist carriage 14 is built which forms an enclosed area within which passengers and cargo are carried.

The lift 12 is moved up and down the slope by the use of the guide cables 24 which run between the hoist rails 18 and are attached to the lift 12. These guide cables 24 transfer the force supplied by an external power source to raise and lower the lift 12 along the hoist rails 18 and, under normal operating conditions, control the upward and downward motion and speed of the lift 12.

An additional cable runs between the hoist rails 18 in the same manner as the guide cables 24 which is known as the static lift cable 22. The static lift cable 22 differs from the guide cables 24 in that it does not move itself and that it is not attached to the lift 12 but only passes through the BANK HOIST braking apparatus 10 that is attached to the brake mount bar 26 component of the hoist frame 16. The brake mount bar 26 runs diagonally from the from the front lower center of the hoist frame 16 to its rear upper center. This provides a frame member for the mounting of the present invention to the hoist frame 16 that runs close to and roughly parallels the surface of the slope, thus, allowing the invention to easily engage the static lift cable 22 located beneath it.

The construction of the body of the present invention is illustrated in FIGS. 2 and 3. The BANK HOIST braking apparatus 10 is made up of a wheel housing 38 and cable cam housing 52 that are attached in line to one side of the brake mount bar 26 of the hoist frame 16. The wheel housing 38 consists of two parallel walls with a space between that contains the idler wheels 34 and the drive wheel 36 which engage the static lift cable 22 as it passes through the invention. As the static cable 22 enters the wheel housing 38 it is threaded under the first idler wheel 34, over the drive wheel 36 and then under the second idler wheel 34 before exiting the wheel housing 38. The two idler wheel's 34 only function in the invention is to ensure that the static cable 22 remains correctly aligned with the drive wheel 36 as the invention passes along the static cable 22. The passage of the drive wheel 36 along the static cable 22 provides rotational force to the clutch hub assembly 28 located on the outside surface of the wheel housing 38 that is not attached to the brake mount bar 26. Finally, the clutch hub assembly 28 is the component of the invention that activates the braking mechanism in over speed situations (this function will be more fully discussed below).

The static cable 22 is also threaded through the cable cam housing 52 which is attached to the brake mount bar 26 in a similar fashion as the wheel housing 38 and in a location so that there is a short gap left between it and the wheel housing 38. The cable cam housing 52 is also constructed of two parallel walls with a space between that contains the cable cam 50 which is pivotally mounted through the pivotal cam mount 60 to and within these walls and which has a decreasing radius curved lower edge which terminates within the cable cam housing 52 just above its lower inside surface. Thus, the static cable 22 passes through the cable cam housing 52 between the lower edge of the cable cam 50 and the lower inside surface of the cable cam housing 52.

The upper end of the pivotally mounted cable cam 50 is connected to a high tension cam spring 54 which extends forward above the brake mount bar 26 to a point where it attaches to the mount bar 26 through the spring tensioning adjustment 58 and the front spring mount 56. The spring tensioning adjustment 57 allows the amount of tension being placed on the cam spring 54 (and the cable cam itself) to be adjusted to compensate for varying conditions encountered in the use of the present invention.

The cable cam 50 also has attached to its most forward edge at a point just below the attachment of the cable cam spring 54 the cam lock 48 which is a relatively small and short metallic bar. The attachment is accomplished through the use of the pivotal cam lock mount 70 which attaches the most rearward point of the cam lock 48 to the cable cam 50 and allows it to freely pivot around this mounting point. The cam lock 48 also has a cam lock notch 62 at about the midpoint of its bottom surface which fits over the cam lock ridge 64 which extends upward from the upper surface of the brake mount bar 26.

The purpose of the cam lock 48 is to lock the cable cam 50 in a position which puts a load on the cable cam spring 54. This is accomplished by forcing the upper end of the cable cam 50 to pivot rearward around the pivotal cam mount 60 which stretches the cable cam spring 54, thus, placing forward pressure on the cable cam 50. The cable cam is then held in this loaded position by placing the cam lock notch 62 over the cam lock ridge 64. The end result of this is that the lower end of the cable cam 50 is pivoted forward which leaves a large enough gap at the lower end of the inside of the cable cam housing 52 for the static cable 22 to pass freely through.

The clutch hub assembly 28 of the present invention is made up primarily of the inner hub 30 and the outer hub 32 which are not in contact with one another in normal circumstances. It is the inner hub 30 that is connected to the drive wheel 36 (and, therefore, to the static cable 22) through the hub axle 66 which extends through the body of the brake mount bar 26. This manner of construction provides rotational force to the inner workings of the clutch assembly hub 28 which is always spinning while the lift 12 is in motion. The outer hub 32 is externally (in respect to the clutch hub assembly 28) connected to the drive sprocket 40 which is connected to the drive chain 42. The fact that the outer hub 32 is not in contact with the inner hub 30 under normal operating conditions allows the outer hub 30, the drive sprocket 40 and the drive chain 42 to remain stationary under normal operating conditions.

The drive chain 42 extends forward from the drive sprocket 40 to a point where it encircles the most forward portion of the cam sprocket 44. The cam sprocket 44 is connected to the brake mount bar 26 in the gap between the wheel housing 38 and the cable cam housing 52 by the use of the cam sprocket axle 68 which extends through the body of the brake mount bar 26. At a point just behind the cam sprocket 44, the cam sprocket axle 68 has attached to it the trip lobe 46 which is short offset cylindrical protrusion of the cam sprocket axle 68 and which is positioned directly beneath the most forward end of the cam lock 48 and forward of the cam lock ridge 64. Under normal operating conditions the offset portion of the trip lobe 46 extends downward so that it does not interfere with the positioning of the cam lock 48.

Figure 4:
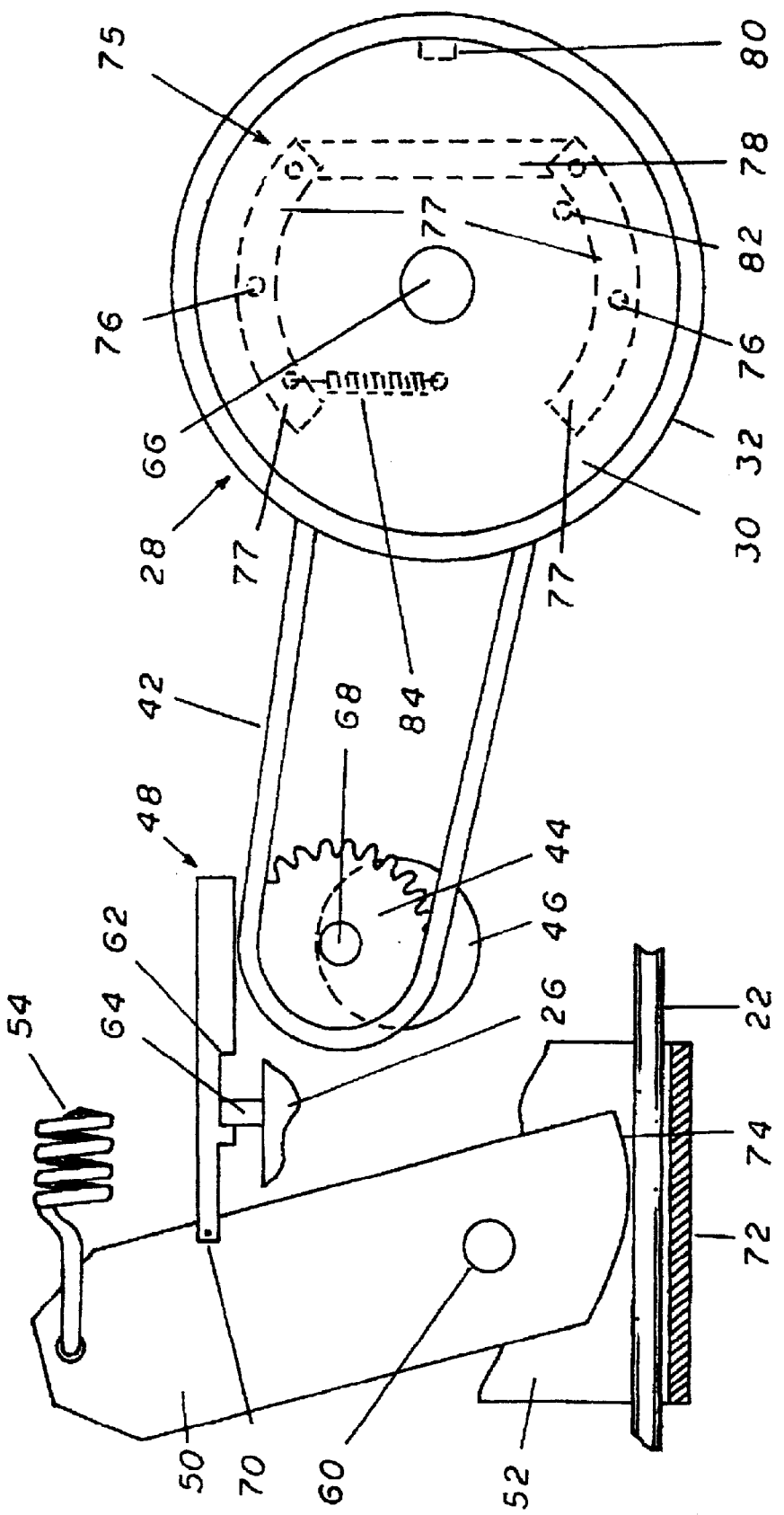
FIG. 4 is a side elevation view of the present invention detailing the method of construction of the cable locking cam and the centrifugal hub used to activate the braking mechanism.
Figure 5:
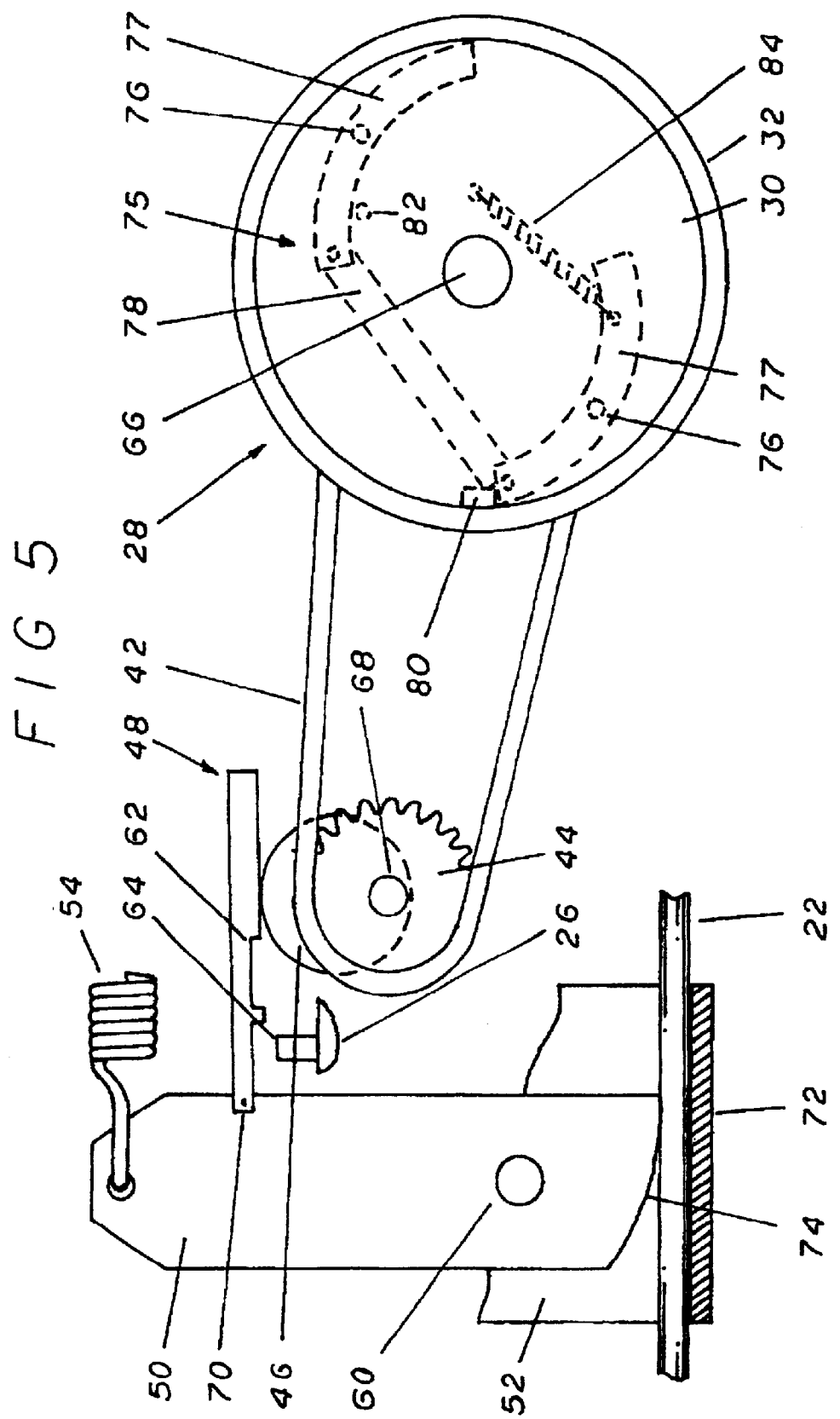
FIG. 5 is a side elevation view of the present invention detailing the manner in which the centrifugal hub activates the cable locking cam to brake the carriage.

The workings of the braking components of the present invention are illustrated in FIGS. 4 and 5. FIG. 4 details the construction of these components and illustrate their orientation under normal operating conditions. The inner hub 30 of the clutch assembly hub 28 contains the counterweight assembly 75 which consists of a pair of identical counterweights 77 that are pivotally mounted at their centers by the use of the counterweight mount pins 76 on opposite sides of the inner hub 32. One of the counterweights 77 has attached to one of its outer ends a counterweight spring 84 and is pivotally attached to the other counterweight 77 by the use of the counterweight connector 78 which is a flat metallic bar that extends from the opposite end of the counterweight spring 84 attachment of the first counterweight 77 to a pivotal attachment on the parallel end of the second counterweight 77. The use of the counterweight connector 78 allows the tension placed on the first counterweight 77 by the counterweight spring 84 to be transferred to the second counterweight 77 and this tension is held in check under normal operating conditions by the weight stop pin 82 which engages the inner surface of the second counterweight 77.

In this configuration, the trip lobe 46 does not engage the cam lock 48 and so the upper end of the cable cam 50 is left in its forward position which in turn rotates its lower cam pinch surface 74 up and away from the cable cam housing floor 72. This allows just enough room between the cable cam housing floor 72 and the cam pinch surface 74 for the static cable 22 to pass freely though. Additionally, the forward positioning of the cable cam 50 by the locking action of the cam lock 48 loads the cable cam spring 54 which provides a contained rearward pressure on the upper portion of the cable cam 50. Thus, under normal operating conditions, the cam pinch surface 74 of the cable cam 50 does not engage the static cable 22 and the lift 12 is free to along its length.

However, in a situation where the lift 12 is allowed to reach a speed that is greater its designed specifications, these components of the present invention work quickly and efficiently to stop the lift 12. The manner in which this is accomplished is detailed in FIG. 5. In a lift 12 over speed situation the increased rotational speed placed on the inner hub 30 of the clutch assembly hub 28 by the increased rate at which the static cable 22 passes over the drive wheel 36 places an outward centrifugal force on the counterweights 77 of the counterweight assembly 75. This situation forces the opposite ends of the two counterweights 77 to rotate outward around the central pivotal mounting to the counterweight mount pins 76, a situation which is aided by the inward tension placed on the counterweights by the counterweight spring 84.

As the two ends of the counterweights 77 expand outward within the inner hub 30 due to its increased rotational speed, one will engage the weight catch 80 which is an inwardly protruding tab located on the inner surface of the outer hub 32. Once this happens, the rotational force of the inner hub 30 is transferred to the outer hub 32 and the drive sprocket 40 through the counterweight assembly 75. This rotational force is then transferred to the cam sprocket 44 through the drive chain 42 which rotates the trip lobe 46 upward to the point where it engages and releases the cam lock 48 from its position on the cam lock ridge 64.

The release of the cam lock 48 from the cam lock ridge 64 allows the tension of the loaded cable cam spring 54 to pull the upper end of the cable cam 50 rearward. This forces the cable cam 50 to rotate around its pivotal cam mount 60 which in turn forces the rear end of the cam pinch surface 74 downward in relation to the cable housing floor 72. The downward motion of the cam pinch surface 74 pinches the static cable 22 between the cam pinch surface 74 and the cam housing floor 72 which effectively stops the relative motion between the present invention and the static cable 22. Thus, the present invention operates quickly and smoothly to stop a lift 12 in an over speed situation which ensures the safety of persons and materials being carried in the hoist carriage 14.

Although the present invention has been described in considerable detail with reference to certain preferred versions thereof, other versions are possible. Therefore, the spirit and scope of the appended claims should not be limited to the description of the preferred versions contained herein.

What is claimed is:

1. An over speed emergency braking system connected to a carriage moving on predefined tracks said tracks having an elongate predefined braking section running parallel to said tracks said braking system comprising;

a drive wheel section in rotatable connection with said predefined braking section said drive wheel section further having an attached counter weight assembly;

a outer hub section about said counter weight assembly;

a pre-loaded braking assembly having a pivotal braking cam mounted in a biasedly pinching position and a housing floor such that when activated said braking cam pinches said predefined braking section against said housing floor; and a means for triggering said pre-loaded braking assembly said means for triggering being connected between said pre-loaded braking assembly and said outer hub section.

2. An over speed emergency braking system as in claim 1 wherein said counter weight assembly is adjustable so as to engage said outer hub section when said drive wheel section rotates at a given rpm or higher.

3. An over speed emergency braking system as in claim 2 wherein said drive wheel section rotates relative to the speed of said carriage.

4. An over speed braking system as in claim 3 further comprising a releasable locking section for holding said pivotal braking cam in an up position.

5. An over speed braking system as in claim 4 wherein said means for triggering said pre-loaded braking assembly comprises a drive connected from said outer hub section to a cam section such that when said outer hub section turns said cam section contacts said releasable locking section and releases said locking section.

6. An over speed braking system as in claim 5 wherein said pre-defined braking section is a flexible cable section.

7. An over speed emergency braking system for use on cars on predefined tracks said tracks having an elongate cable braking section running parallel to said tracks said braking system comprising;

a drive wheel section in rotatable connection with said predefined braking section;

a rotatable outer hub section about said drive wheel section;

a counter weight assembly for engaging said outer hub with said drive wheel section at a preset speed;

a pre-loaded braking assembly having a pivotal braking cam mounted in biasedly pinching position and a housing floor such that when activated said braking cam pinches said elongate cable braking section against said housing floor; and a cam section connected to said outer hub said cam section positioned so as to activate said pre-loaded braking assembly.

8. An over speed emergency braking system as in claim 7 wherein said counter weight assembly is adjustable so as to engage said outer hub section when said drive wheel section rotates at a given rpm or higher.

9. An over speed emergency braking system as in claim 8 wherein said drive wheel section rotates relative to the speed of said carriage.

10. An over speed braking system as in claim 9 further comprising a releaseable locking section for holding said pivotal braking cam in an up position.

11. An over speed braking system as in claim 10 wherein said cam section is connected to said outer hub through a chain drive.

12. An over speed braking system as in claim 11 wherein said pivotal braking cam is downwardly biased using a spring.

13. An over speed emergency braking system for use on cars traveling on predefined tracks said braking system comprising:

an elongate cable braking section running parallel to said tracks;

a drive wheel section connected to said car in rotatable connection with said elongate cable such that said drive wheel section rotates relative to the speed of said car;

a rotatable outer hub section about said drive wheel section said outer hub section having a fixedly connected drive sprocket;

a counter weight assembly for engaging said outer hub with said drive wheel section at a preset speed;

a second sprocket fixedly connected to a cam section;

a drive connection between said drive sprocket and said second sprocket;

a pre-loaded braking assembly for frictionally pinching said elongated cable braking section; and a trip section connected to said pre-loaded braking assembly such that the rotation of said cam section releases said pre-loaded braking assembly pinching said elongated cable braking section.

14. An over speed emergency braking system as in claim 13 wherein said counter weight assembly is adjustable so as to engage said outer hub section when said drive wheel section rotates at a given rpm or higher.

15. An over speed braking system as in claim 14 further comprising a releaseable locking section for holding said pivotal braking cam in an up position.

16. An over speed emergency braking system as in claim 15 wherein said pre-loaded braking assembly comprises a pivotal braking cam mounted in biasedly pinching position and a housing floor for frictionally pinching said cable braking section.

17. An over speed braking system as in claim 16 wherein said pivotal braking cam is downwardly biased using a spring.

* * * * *